(12) United States Patent
vom Stein

(10) Patent No.: US 11,104,391 B2
(45) Date of Patent: Aug. 31, 2021

(54) SEAL ASSEMBLY

(71) Applicant: Aktiebolaget SKF, Gothenburg (SE)

(72) Inventor: Hans-Joachim vom Stein, Odenthal (DE)

(73) Assignee: AKTIEBOLAGET SKF, Gothenburg (SE)

( * ) Notice: Subject to any disclaimer, the term of this patent is extended or adjusted under 35 U.S.C. 154(b) by 108 days.

(21) Appl. No.: 16/411,486

(22) Filed: May 14, 2019

(65) Prior Publication Data

US 2019/0351956 A1 Nov. 21, 2019

(30) Foreign Application Priority Data

May 18, 2018 (DE) .......................... 102018207905.6

(51) Int. Cl.
*F16J 15/3208* (2016.01)
*B62D 55/088* (2006.01)
*B62D 55/092* (2006.01)

(52) U.S. Cl.
CPC ....... *B62D 55/0887* (2013.01); *B62D 55/092* (2013.01); *F16J 15/3208* (2013.01)

(58) Field of Classification Search
CPC .. F16J 15/3208; F16J 15/3204; F16J 15/3212; F16J 15/3232; F16J 15/3236; B62D 55/0887; B62D 55/08; B62D 55/088; B62D 55/15; B62D 55/092; F16C 33/72
USPC ...................................................... 277/553
See application file for complete search history.

(56) References Cited

U.S. PATENT DOCUMENTS

| 4,132,418 A * | 1/1979 | Roli ...................... F16J 15/344 277/382 |
| 8,360,534 B2 * | 1/2013 | Vom Stein ............. F16J 15/344 305/103 |
| 8,485,926 B2 * | 7/2013 | Vom Stein ............. B62D 55/15 474/206 |
| 8,770,675 B2 * | 7/2014 | Vom Stein ........... F16J 15/3456 305/105 |
| 9,353,866 B2 * | 5/2016 | Jensen ................... B62D 55/21 |
| 2007/0267821 A1 * | 11/2007 | Vom Stein ......... B62D 55/0887 277/500 |
| 2010/0148572 A1 * | 6/2010 | Vom Stein ......... B62D 55/0887 305/103 |
| 2011/0140509 A1 * | 6/2011 | vom Stein ........... F16J 15/3456 305/105 |
| 2011/0248561 A1 * | 10/2011 | Dolata ............... B62D 55/0887 305/104 |

(Continued)

FOREIGN PATENT DOCUMENTS

DE 19708630 A1 * 9/1998 ............. F16D 3/385

*Primary Examiner* — Nathan Cumar
(74) *Attorney, Agent, or Firm* — J-Tek Law PLLC; Scott T. Wakeman; Mark A. Ussai

(57) ABSTRACT

A seal assembly for sealing a lubricant space that is formed between a pin, a track shoe pressed-on onto one end of the pin, and a sleeve of a track. The sleeve is pushed onto the pin and is swivelable on the pin. The track further includes at least one second track shoe pressed onto one end of the sleeve. The seal assembly provides a first seal ring for sealing the lubricant space between the sleeve and the first track shoe, and an elastic ring for applying pressure to the first seal ring. The seal assembly further provides a second seal ring for sealing the lubricant space between sleeve and the first track shoe and/or the pin.

16 Claims, 1 Drawing Sheet

(56) References Cited

U.S. PATENT DOCUMENTS

2013/0200688 A1\* 8/2013 Vom Stein ............ F16J 15/344
　　　　　　　　　　　　　　　　　　　　305/103

\* cited by examiner

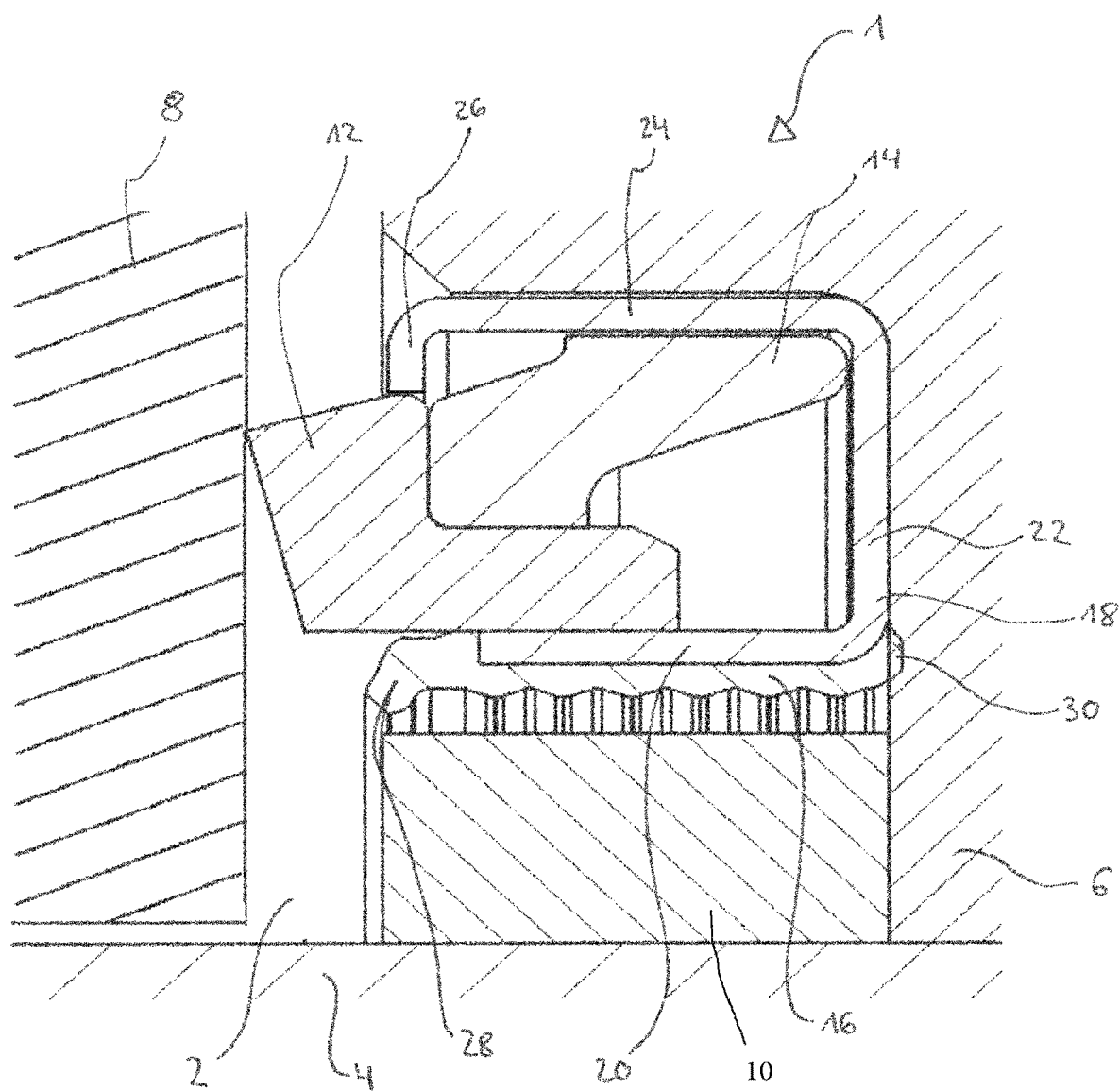

SEAL ASSEMBLY

CROSS-REFERENCE TO RELATED APPLICATIONS

This application claims priority to German patent application no. 102018207905.6 filed on May 18, 2018, the contents of which are fully incorporated herein by reference.

FIELD OF THE INVENTION

The present invention relates to a seal assembly for sealing a lubricant space according to the preamble of patent claim 1, wherein the lubricant space is formed between a pin, a first track shoe pressed-on onto one end of the pin, and a sleeve of a track, which sleeve is pushed-on onto the pin and is swivelable on the pin, wherein the track further includes at least one second track shoe pressed-on onto one end of the sleeve.

BACKGROUND OF THE INVENTION

With tracks, in particular of track vehicles, the links of the track are usually connected to one another via swivel joints. Here such a swivel joint comprises a pin and a sleeve, which is rotatably pushed-on over the pin, wherein links of the track are each pressed-on onto the ends of the pin and of the sleeve. The contact surfaces between the pin and the sleeve are lubricated by a lubricant that is present in a lubricant space between pin and sleeve. This lubricant space is sealed by one or more seal assemblies. The lubricant can be, in particular, oil.

The seal assemblies used in known tracks use a seal element that seals the lubricant space both with respect to an escape of the lubricant and with respect to an entry of impurities. However a sealing against an entry of impurities and a sealing against an escape of lubricant have different requirements. If, for example, the seal element is optimized for sealing against an entry of impurities, the seal element is usually configured stiffer and can press more poorly against the contact surfaces than is the case with a seal element that is optimized for sealing against lubricant escape. Thus in such a case an escape of lubricant from the lubricant space can result over time.

It is therefore the object of the present invention to provide a seal assembly using which an optimized sealing is made possible.

BRIEF SUMMARY OF THE INVENTION

This object is achieved by a seal assembly for sealing a lubricant space according to patent claim 1. The lubricant space that is sealed by the seal assembly is formed between a pin, a first track shoe pressed-on onto one end of the pin, and a sleeve of a track, which sleeve is pushed-on onto the pin and is swivelable on the pin, wherein the track further includes at least one second track shoe pressed-on onto one end of the sleeve.

The seal assembly can be disposed, for example, in a cavity provided in the first track shoe. In a not-fully-assembled state a part of the seal assembly can protrude beyond the track shoe toward the sleeve in order to seal the lubricant space. Alternatively the seal assembly can be disposed in a cavity provided in the sleeve, wherein in a not-fully-assembled state a part of the seal assembly can protrude beyond the sleeve toward the first track shoe in order to seal the lubricant space. In the fully assembled state the sleeve abuts against the first track shoe, whereby the seal assembly is pressed-in between the sleeve and the first track shoe. Here the protruding section is pressed against the sleeve or the track shoe and thus seals the lubricant space.

The seal assembly includes a first seal ring for sealing the lubricant space between the sleeve and the first track shoe, and an elastic ring for applying pressure to the first seal ring. Here the elastic ring serves to press the first seal ring onto the sleeve or the first track shoe after assembly. This can help to ensure sealing by the first seal ring and/or to prevent twisting or tilting of the first seal ring.

In order to improve the sealing of the lubricant space in comparison to known seal assemblies, the seal assembly includes a second seal ring. This serves for sealing the lubricant space between the sleeve and the first track shoe and/or the pin.

Due to the use of two seal rings, the sealing of the lubricant space can be optimally ensured since the two seal rings can fulfill different functions. The two seal rings can advantageously be configured differently from each other, whereby a simple adapting of the entire seal assembly to the different functions is possible.

The first seal ring is preferably optimized for sealing the lubricant space against an entry of impurities, and the second seal ring is preferably optimized for sealing the lubricant space against an escape of lubricant. Such an optimization can be effected in different ways, for example, based on the shape or the material of the seal rings or by a combination thereof. The first seal ring can comprise a first material, and the second seal ring can comprise a second material. Here the first material is preferably optimized for sealing against an entry of impurities, and the second material is optimized for sealing against an escape of lubricant.

In one embodiment the first material can be stiffer than the second material. For example, the first material can be a thermoplastic material, such as, for example, polyurethane, or a ceramic material. The second material can be an elastomeric material, in particular rubber.

Due to the use of different materials, the function of the two seal rings can be optimized on the one hand for sealing against the entry of impurities from the outside, and on the other hand with respect to the escape of lubricant. A soft material, such as, for example, rubber, is particularly well suited to prevent the escape of lubricant since this material can be optimally adapted to the environment. A harder material, such as, for example, polyurethane, is particularly well suited to prevent the entry of foreign objects into the lubricant space since this material is sufficiently hard to provide sufficient stability against influence of foreign objects, for example, if the foreign objects are deposited on the seal ring.

Alternatively or additionally the shape of the first seal ring can be optimized for sealing against the entry of impurities, and the shape of the second seal ring can be optimized for sealing against an escape of lubricant. The position of the seal rings can also be adapted depending on the sealing desired. For example, the first seal ring can be disposed between the sleeve and the first track shoe such that the lubricant space is effectively sealed against the entry of impurities, whereas the second seal ring can be disposed between the sleeve and the first track shoe and/or the pin such that it prevents an escape of lubricant.

The first seal ring can be configured, for example, L-shaped in cross-section, wherein the first seal ring includes a seal lip on a first section of the first seal ring, which seal lip abuts on the sleeve or the first track shoe. A second section of the first seal ring, which second section extends axially from the first section, can extend into the seal assembly, i.e., into the cavity in the first track shoe or the sleeve. The second seal ring can extend axially, wherein the axially extending second section of the first seal ring and the second seal ring overlap. The two seal rings are preferably disposed in contact with each other or at least in proximity to each other. Due to this arrangement the entire lubricant space can be sealed against the entry of impurities and against the escape of the lubricant. Only by a combination of the two seal rings is a sealing against both the entry of impurities and the escape of the lubricant possible.

The two seal rings are configured as separate elements. A readjusting of the first or of the second seal ring independently of each other is thereby possible.

The second seal ring can be equipped with a stiffening insert that extends axially in a first section. Here the second seal ring can be separate from the stiffening insert and connected thereto, or the stiffening insert can be manufactured integrally with the seal ring. Since the second seal ring is comprised of a material that is soft, the stiffening insert enables the second seal ring to retain its shape even under contact pressure.

In one embodiment the stiffening insert can be disposed such that it serves as a carrier or as a guide for both the first seal ring and the second seal ring. For example, the stiffening insert can be disposed between the first and the second seal ring.

The stiffening insert can include a second section that extends radially from one end of the first section, and include a third section that extends axially from one end of the second section, wherein the stiffening insert is configured U-shaped. Due to the U shape of the stiffening insert a type of housing can be formed in or on which the seal rings are disposed, and which can be inserted as a unit into the lubricant space or the cavity in the sleeve or the track shoe.

In order to seal the interior of this housing, the stiffening insert can include a radially extending protrusion on one end of the third section, which radially extending protrusion contacts the first seal ring. Due to the contact between the stiffening insert and the first seal ring a self-contained space can be formed by the seal rings and the stiffening insert. In this way the sealing of the lubricant space can be further improved.

The stiffening insert can be disposed with a clearance with respect to the sleeve, with respect to the first track shoe, and/or the pin. Due to such a clearance an expansion of the stiffening insert, for example, due to temperature fluctuations, can be compensated. Alternatively the stiffening insert can be disposed without clearance, that is, pressed-in.

According to one embodiment the stiffening insert can include a third material that is stiffer than the first and the second material and in particular is metal. Due to the use of such a stiff material the first and/or the second seal can be stabilized particularly well.

In the seal assembly a spacer ring can be provided that is disposed on the pin between the first track shoe and the sleeve in order to form a spacing between the sleeve and the track shoe. Due to this spacer ring it is possible to arrange the seal assembly spaced from the pin. In this way the lubricant space that is disposed between the pin and the sleeve and extends in the region between sleeve, first track shoe, and pin, can be enlarged in this region since the seal assembly does not rest on the pin. Instead it is disposed away from the pin radially at a distance that corresponds to the size of the spacer ring. In this case a radial supporting of the seal assembly is therefore achieved not by the pin but by the spacer ring.

In a further embodiment the second seal ring can include a seal lip that abuts on the first track shoe or the sleeve. In particular the seal lip is configured such that it is pressed-on onto the first track shoe or the sleeve. Due to this pressing-on a good sealing between the second seal ring and the first track shoe can be achieved.

Further advantages and advantageous embodiments are specified in the description, the drawings, and the claims. Here in particular the combinations of features specified in the description and in the drawings are purely exemplary, so that the features can also be present individually or combined in other ways.

BRIEF DESCRIPTION OF THE SEVERAL VIEWS OF THE DRAWING

In the following the invention shall be described in more detail using exemplary embodiments depicted in the drawings. Here the exemplary embodiments and the combinations shown in the exemplary embodiments are purely exemplary and are not intended to define the scope of the invention. This scope is defined solely by the pending claims.

FIG. 1 shows a seal assembly for sealing a lubricant space.

DETAILED DESCRIPTION OF THE INVENTION

In the following, identical or functionally equivalent elements are designated by the same reference numbers.

FIG. 1 shows a seal assembly 1 for sealing a lubricant space 2 that is formed between a pin 4, a track shoe 6 pressed-on onto one end of the pin 4, and a swivelable sleeve 8 of a track, which sleeve is pushed-on onto the pin 4. The lubricant contained in the lubricant space 2 serves to lubricate the region between the pin 4 and the sleeve 8.

In order to form a reservoir for the lubricant, the space between the pin 4, the track shoe 6, the sleeve 8, and the seal assembly 1 can be enlarged by the use of a spacer ring 10. The spacer ring 10 can be pushed-on over the pin 4 with an axial clearance between the first track shoe 6 and the sleeve 8. Due to the spacer ring 10 the seal assembly 1 can be disposed with a spacing to the pin 4, whereby the lubricant space 2 that is sealed by the seal assembly 1 is enlarged. The seal assembly 1 can be disposed in a cavity that is formed in the first track shoe 6. In a not-shown alternative embodiment the seal assembly 1 can be disposed in a cavity that is formed in the sleeve 8. The following description applies analogously in this case.

The seal assembly 1 includes a first seal ring 12. This is preloaded via an elastic ring 14. For example, the first seal ring 12 and the elastic ring 14 are connected to each other. They can be introduced into the cavity in a compressed state. If they are brought into position, the elastic ring 14 expands and presses against the first seal ring 12. On the other side the elastic ring 14 is supported in the cavity, either directly on the first track shoe 6 or on an insert 18 that is described in more detail below. The first seal ring 12 is held in position in this way.

Furthermore, the seal assembly 1 includes a second seal ring 16. Two different seal rings 12, 16 are thus used that can fulfill different functions, as will be described in more detail below.

The first seal ring 12 is optimized for sealing against an entry of impurities, whereas the second seal ring 16 is optimized for sealing against an escape of the lubricant. On the one hand the first seal ring 12 can be formed from a stiffer material than the second seal ring 16. Here the material of the first seal ring 12 should be particularly suited to keeping impurities from the outside out of the lubricant space 2. The material of the second seal ring 16 should be particularly well suited for a sealing of the lubricant space 2 with respect to the lubricant itself, in particular oil, and can be, for example, a soft rubber material. The second seal ring 16 can also be referred to as a soft-material seal.

In this way different seal rings 12, 16 can be used that are each optimized for a specific application. The seal rings 12, 16 can be configured in a more specialized manner by the use of different materials and shapes.

A stiffening insert 18 is used to support the second seal ring 16. A first section 20 of the stiffening insert 18 extends axially and is connected to the second seal ring 16. The stiffening insert 18 preferably includes a second section 22 that extends radially from the first section 21, and a third section 24 that extends axially from the second section 22. In this way a type of U-shaped housing is formed wherein the seal rings 12, 16 and the elastic ring 14 are disposed.

The stiffening insert 18 can include a protrusion 26 that extends radially inward from the third section 24 up to the first seal ring 12. Due to this protrusion 26 an additional sealing can be achieved since the seal assembly 1 is self-contained by the first seal ring 12 and the protrusion 26.

The first seal ring 12 is formed L-shaped wherein a seal lip is pressed against the sleeve 8. If the seal assembly 1 is installed, the elastic ring 14 is deformed as described above, whereby the elastic ring 14 presses the first seal ring 12 onto the sleeve 8.

The second seal ring 16 is configured elongated. The second seal ring 16 is configured corrugated on the side of the second seal ring 16 that is disposed facing the spacer ring 10 or pin 4. Due to this corrugation a particularly good adaptation to the base is possible under pressure.

The second seal ring 16 includes two seal lips 28, 30. The seal lip 28 serves for sealing against the spacer ring 10. The seal lip 30 abuts on the track shoe 6 in order to ensure a sealing of the lubricant space 2 toward the first track shoe 6. Since the second seal ring 16 simultaneously abuts on the first seal ring 12 and the stiffening insert 18, an escape of lubricant also cannot occur at a transition between the first and the second seal ring 12, 16. The first seal ring 12 abuts on the sleeve 8 and, as described above, is pressed onto it by the elastic ring 14, whereby the lubricant space 2 is also sealed at this location.

In summary, an improved sealing of the lubricant space in a track against an entry of impurities and an escape of lubricant can be achieved by the use of two different seal rings that can be adapted to different functions by material and/or shape.

REFERENCE NUMBER LIST

1 Seal assembly
2 Lubricant space
4 Pin
6 First track shoe
8 Sleeve
10 Spacer ring
12 First seal ring
14 Elastic ring
16 Second seal ring
18 Stiffening insert
20 First section
22 Second section
24 Third section
26 Protrusion
28 Seal lip
30 Seal lip

What is claimed is:

1. A seal assembly for sealing a lubricant space that is formed between a pin, a first track shoe pressed-on onto one end of the pin, and a sleeve of a track, the sleeve being pushed onto the pin and is swivelable on the pin, the seal assembly comprising:
    a first seal ring for sealing the lubricant space between the sleeve and the first track shoe,
    an elastic ring for applying pressure to the first seal ring, and
    the seal assembly includes a second, separate seal ring for sealing the lubricant space between the sleeve and the first track shoe and/or the pin;
    wherein the second seal ring is provided with a stiffening insert that extends axially in a first section and includes a second section that extends radially from one end of the first section, and a third section that extends axially from one end of the second section, wherein the stiffening insert is configured U-shaped.

2. The seal assembly according to claim 1, wherein the first seal ring is optimized for a sealing of the lubricant space against an entry of impurities, and the second seal ring is optimized for a sealing of the lubricant space against an escape of the lubricant.

3. The seal assembly according to claim 2, wherein the first material is optimized for a sealing against an entry of impurities and the second material is optimized for a sealing against an escape of lubricant, and/or wherein the shape of the first seal ring is optimized for a sealing against an entry of impurities and the shape of the second seal ring is optimized for a sealing against an escape of the lubricant.

4. The seal assembly according to claim 1, wherein the first seal ring includes a first material, and wherein the second seal ring includes a second material.

5. The seal assembly according to claim 1, wherein the first material is stiffer than the second material, wherein the first material is a thermoplastic material, in particular polyurethane, or a ceramic material, and/or wherein the second material is an elastomeric material, in particular rubber.

6. The seal assembly according to claim 1, wherein on one end of the third section the stiffening insert includes a radially extending protrusion that contacts the first seal ring.

7. The seal assembly according to claim 1, wherein the stiffening insert is disposed with a clearance with respect to the sleeve, the first track shoe, and/or the pin.

8. The seal assembly according to claim 1, wherein the stiffening insert comprises a third material that is stiffer than the first and the second material, wherein the third material includes in particular metal.

9. The seal assembly according to claim 1, further comprising a spacer ring being disposed on the pin between the first track shoe and the sleeve.

10. The seal assembly according to claim 1, wherein the second seal ring includes a seal lip that abuts on the first track shoe or in the sleeve.

11. The seal assembly according to claim 1, further comprising a spacer ring disposed on the pin between the first track shoe and the sleeve and wherein the second seal ring includes a first seal lip sealing against the spacer ring and a second seal lip abutting on the first track shoe.

12. The seat assembly according to claim 11 wherein the second seal ring is corrugated on the side of the second seal ring disposed facing the spacer ring or the pin.

13. The seal assembly according to claim 1, wherein the first seal ring is disposed within the insert and the second seal ring is supported on the insert.

14. The seal assembly according to claim 1, wherein the first seal ring is configured to seal axially against the sleeve and the second seal ring is configured to seal axially against the first track shoe and against the first seal ring.

15. A seal assembly for sealing a lubricant space that is formed between a pin, a first track shoe pressed-on onto one end of the pin, and a sleeve of a track, the sleeve being pushed onto the pin and is swivelable on the pin, the seal assembly comprising:
    a first seal ring for sealing the lubricant space between the sleeve and the first track shoe,
    an elastic ring for applying pressure to the first seal ring,
    the seal assembly includes a second, separate seal ring for sealing the lubricant space between the sleeve and the first track shoe and/or the pin, and
    a spacer ring disposed on the pin between the first track shoe and the sleeve,
    wherein the second seal ring includes a first seal lip sealing against the spacer ring and a second seal lip abutting on the first track shoe.

16. A seal assembly for sealing a lubricant space that is formed between a pin, a first track shoe pressed-on onto one end of the pin, and a sleeve of a track, the sleeve being pushed onto the pin and is swivelable on the pin, the seal assembly comprising:
    a first seal ring for sealing the lubricant space between the sleeve and the first track shoe,
    an elastic ring for applying pressure to the first seal ring,
    the seal assembly includes a second, separate seal ring for sealing the lubricant space between the sleeve and the first track shoe and/or the pin, and
    a U-shaped insert, the first seal ring being disposed within the U-shaped insert and the second seal ring being supported on the U-shaped insert.

* * * * *